(12) United States Patent
Van Heerden et al.

(10) Patent No.: US 6,677,917 B2
(45) Date of Patent: Jan. 13, 2004

(54) FABRIC ANTENNA FOR TAGS

(75) Inventors: Clive R. Van Heerden, Riverdale, NY (US); George Marmaropoulos, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/084,718

(22) Filed: Feb. 25, 2002

(65) Prior Publication Data

US 2003/0160732 A1 Aug. 28, 2003

(51) Int. Cl.⁷ .................................................. H01Q 1/36
(52) U.S. Cl. .................... 343/897; 343/718; 342/357.01
(58) Field of Search ................................. 343/718, 897, 343/893; 342/357.01

(56) References Cited

U.S. PATENT DOCUMENTS

| | | | |
|---|---|---|---|
| 5,682,143 A | 10/1997 | Brady et al. | 340/572.7 |
| 5,771,027 A | 6/1998 | Marks et al. | 343/912 |
| 5,785,181 A * | 7/1998 | Quartararo, Jr. | 209/3.3 |
| 5,825,327 A | 10/1998 | Krasner | 342/357 |
| 6,069,564 A | 5/2000 | Hatano et al. | 340/572.7 |
| 6,094,173 A | 7/2000 | Nylander | 343/742 |
| 6,147,606 A | 11/2000 | Duan | 340/572.7 |
| 6,259,399 B1 * | 7/2001 | Krasner | 342/357.06 |
| 6,285,342 B1 * | 9/2001 | Brady et al. | 343/895 |
| 2001/0013830 A1 | 8/2001 | Garber | |
| 2001/0017759 A1 | 8/2001 | Marmaropoulos | |
| 2001/0030628 A1 | 10/2001 | Brady et al. | |

* cited by examiner

*Primary Examiner*—Don Wong
*Assistant Examiner*—Shih-Chao Chen
(74) *Attorney, Agent, or Firm*—Aaron Waxler

(57) ABSTRACT

A method and system for providing a RFID transponder having a fabric antenna. The system including a radio frequency (RF) transponder, the transponder having a housing, an RF circuit enclosed in said housing, and a fabric antenna coupled to the RF circuit. The method of fabricating a radio frequency (RF) transponder including the steps of enclosing an RF circuit in a housing, forming a fabric antenna and coupling the fabric antenna to the RF circuit.

15 Claims, 3 Drawing Sheets

FABRIC ANTENNA FOR TAGS

BACKGROUND OF THE INVENTION

1. Field of the Invention

The present invention relates to radio frequency (RF) transponders such as radio frequency identification (RFID) transponders, and in particular to a method and system for providing a RFID transponder having a fabric antenna.

2. Description of the Related Art

RFID systems are useful in a wide variety of applications, including, for example, security access, retail automation, inventory control, personnel identification, and manufacturing automation. RFID systems typically include an RFID transponder (hereinafter, an RF tag) having a semiconductor memory and an antenna, and an RFID interrogator comprising a transmitter-receiver unit for querying the RF tag via a wireless communication link. The RF tag detects the interrogating signal and transmits an encoded response signal to the interrogator. RF tags may be active or passive. An active RF tag includes an internal battery source to operate the active RF tag's associated electronics, whereas a passive RF tag does not have an internal power supply.

An advantage provided by RFID systems is that the RF tags are readable at distances away from the interrogator. Another advantage is that the RF tag may be obscured from view and attached to a product or person in a hidden location. The RF tags may be hidden for a variety of reasons, including but not limited to, security, aesthetics, and manufacturing costs concerns. For these and other reasons, it is desirable to embody the RF tags in a very small form factor. Due to advances in electronics miniaturization, form factors on the scale of coins are possible. Accordingly, RF tags may be embedded in garment tags, product tags, and clothing.

A limiting factor in the manufacture of RF tags however is the size of the RF tag's built-in antenna. RF tags typically include an antenna formed on a substrate and electrically connected to the RF tag's electronic components. The built-in antenna permits detection of the interrogator signal and remote reading of the encoded signal from the RF tag within a prescribed distance (i.e., a "reading zone") of the RF tag.

Various antenna configurations are known to those skilled in the art, such as, for example, a dipole antenna. A dipole antenna should typically have a physical length approximately one-half wavelength ($\lambda/2$) of the RF tag's operating frequency. While the length of this type of antenna may be short for the operating frequency of an RF tag (e.g., 7 cm long), it is still larger than many desired RF tag form factors.

Moreover, the use of a larger antenna can be employed to extend the reading zone of the RF tag. However, including the larger antenna in the RF tag has the undesired effect of increasing the minimum size of the RF tag package.

Accordingly, there exists a need to overcome the size constraints imposed on the RF tag antenna by the size limitation of the RF tag's housing or for factor.

SUMMARY OF THE INVENTION

It is an object of the present teachings to provide an antenna for an RF tag that overcomes the size limitations imposed by the housing of the RF tag.

It is another object of the present teachings to provide an RF tag having an antenna enabling improved detection and transmission of signals.

In accordance with the present teachings, an RF tag, including an RF tag having a small form factor, includes a housing, an RF integrated circuit enclosed in the housing, and a fabric antenna coupled to said RF integrated circuit and located outside of the housing. Further, a method of fabricating an RF tag is disclosed wherein the method includes the steps of enclosing an RF integrated circuit in a housing, forming a fabric antenna, and coupling the fabric antenna to the RF integrated circuit.

The above and other objects, advantages, and benefits of the present invention will be understood by reference to following detailed description and appended sheets of drawings.

DETAILED DESCRIPTION OF THE INVENTION

Figure 1:
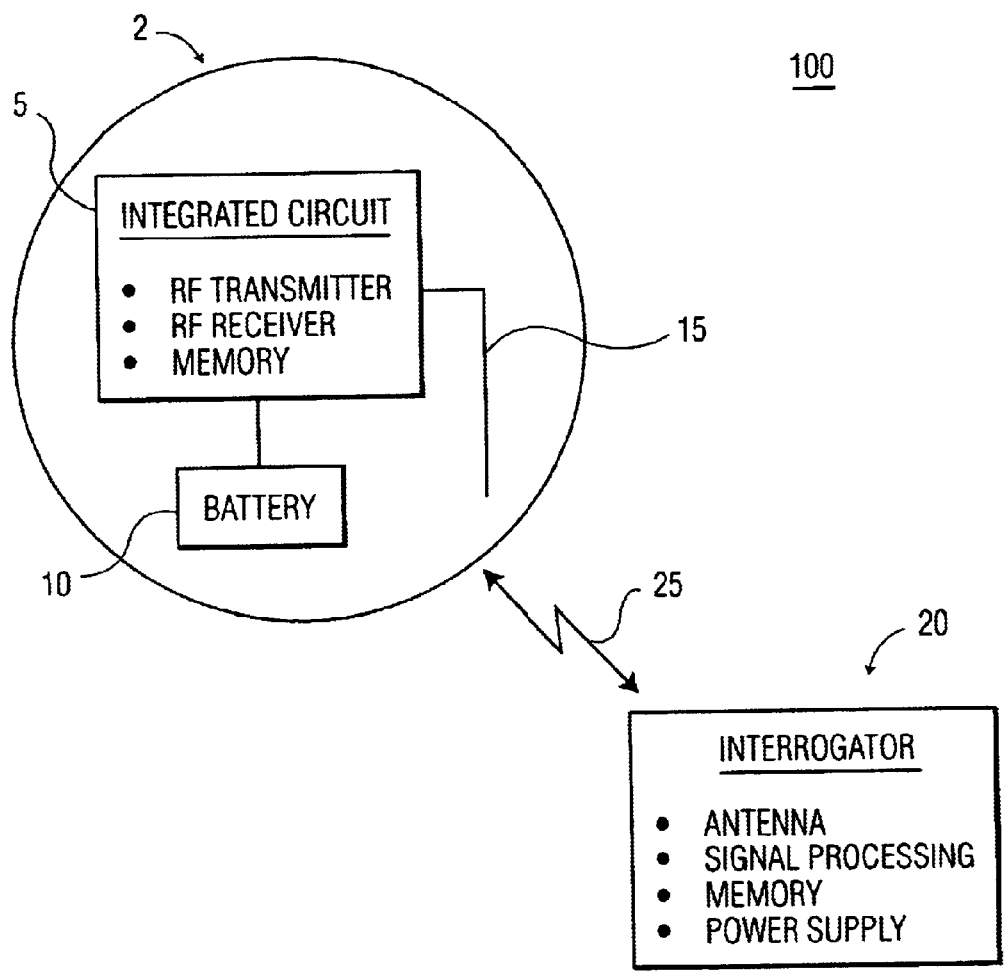
FIG. 1 is a depiction of a prior art RF tag in an RFID system environment applicable for implementing the invention of the present teachings.

With reference to FIG. 1, there is depicted an exemplary RFID system 100 environment applicable for an RF tag having a fabric antenna of the present teachings. In particular, FIG. 1 depicts an RF tag 2 and an RF interrogator 20 associated with RF tag 2. RF tag 2 includes an exemplary integrated circuit 5. Exemplary integrated circuit 5 includes, for example, an RF transmitter for transmitting a signal (e.g., signal 25), an RF receiver for receiving signal 25, and a memory for storing data. Battery 10 is provided in RF tag 2 for powering integrated circuit 5, in the case of an active tag. In the instance RF tag 2 is a passive tag, battery 10 is not included in RF tag 2. As will be made clear in the following description, the present teachings may be extended to encompass both active tags and passive tags. RF tag 2 is illustrative of an RF tag including an antenna 15 in the housing enclosing RF tag 2. Built-in antenna 15 is coupled to integrated circuit 5 and facilitates transmission and reception of signal 25 to and from interrogator 20, respectively.

Interrogator 20 suitable for use with RF tag 2 includes, for example, a transceiver for transmitting and receiving signal 25 to and from RF tag 2, a signal processor for processing signal 25, a memory for storing data, a power supply, and an antenna. It should be appreciated by those skilled in the art that interrogator 20 may be implemented in a variety of ways, using discrete components or an integrated circuit such as a single chip.

Signal 25 transmitted by interrogator 20 for querying RF tag 2 via wireless communication link is detected by RF tag 2 to initiate a response from RF tag 2 in regards thereto. Accordingly, signal 25 transmitted by interrogator 20 must be sufficiently strong at antenna 15 in order to elicit a response from RF tag 2. A number of factors affect the detection capability of RF tag 2, including for example, the distance between RF tag 2 and interrogator 20, the polarization of antenna 15, the polarization of signal 25, the orientation of RF tag 2 (including antenna 15), and the intervening medium between RF tag 2 and interrogator 20. These factors are but examples and are not intended, nor should they be construed, as exhaustive of the factors affecting the detection capability of the RF tag 2.

The configuration, including the size, shape, and routing, of antenna 15 can have an advantageous impact on the detection capability of RF tag 2. For example, increasing the size and/or orientation of antenna 15 can have a positive consequence on increasing the reading zone or distance at which RF tag and interrogator 20 can be separated and still reliably communicate with each other. Increasing the size of built-in antenna 15 for optimal detection however runs counter to packaging RF tag 2 is a small form factor. The size of the RF tag packaging (i.e., housing) can also impose limitations on the shape and routing of built-in antenna 15.

As discussed above, since it is highly desirable to package RF tag 2 in as small of a form factor as possible in many applications, having a small form factor and increasing the reading zone by increasing the size of antenna 15 built-in and housed in RF tag 2 are competing objectives. Consequently, a compromise in obtaining system objectives may have to be settled upon in system 100.

Figure 2:
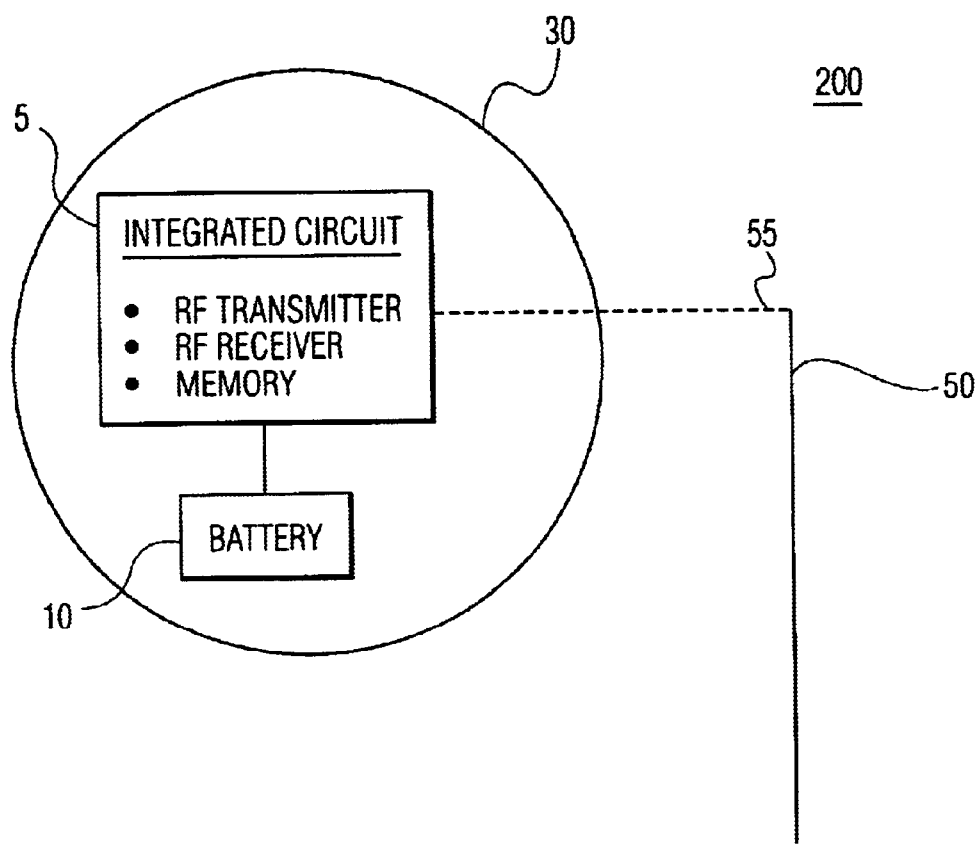
FIG. 2 is an exemplary embodiment of an RF tag and a fabric antenna coupled thereto in accordance with the present teachings.

Turning to FIG. 2, there is depicted an active RF tag 200 in accordance with the teachings of the present invention. In an aspect of the present teachings, RF tag 200 includes a fabric antenna 50 located outside of a RF tag 200 housing 30. Housing 30 encloses, for example, integrated circuit 5 and battery 10. The functional operation of integrated circuit 5 and battery 10 of RF tag 200 can be understood by referencing the discussion of RF tag 2 above.

In an aspect of the present invention, fabric antenna 50 is a flexible fabric antenna. Fabric antenna 50 may be attached to an interior and/or exterior surface (e.g., fabric) of a garment and/or concealed in a seam of the garment. Fabric antenna 50 may comprise a flexible conductive material disposed on a fabric surface, a plurality of conductive threads interwoven with the fabric of a garment, or a combination thereof. An exemplary fabric for use in implementing fabric antenna 50 is a woven nylon plated with a layer of copper, silver, or nickel, such as, for example, Shieldex™. Fabric antenna 50 can be implemented using layers of conductive, insulating, and dielectric materials.

It should be appreciated by those skilled in the art that fabric antenna 50 may comprise all antennas suitable for RF communication, including but not limited to a dipole, a patch, a folded dipole, and a polarizing antenna. Fabric antenna 50 may be in the form of a strip of conductive woven material.

Fabric antenna 50 may be embodied as a plurality of fabric antennas distributed in a garment, wherein each of the plurality of fabric antennas is coupled to another of the fabric antennas or RF tag 200 using a suitable conductor. Antenna 50 may also comprise a plurality of fabric antennas disposed in various articles of clothing (e.g., a shoe, each leg of a pair of trousers, and a shirt collar). The application environment of RF tag 200 can be used as a factor in determining the placement of fabric antenna(s) 50 in the garment for optimal signal detection and improved reading zone.

Fabric antenna 50 may be coupled to other fabric antenna elements and RF tag 200 using, for example, conductive thread, conductive glue, and interfaced (i.e., touching) conductive layers of material sewn together. Fabric antenna 50 may be coupled to RF tag 200 using a coaxial cable, a micro strip, a strip line, a twin line, a triplate, or other suitable feed 55 line for the operating environment of RF tag 200 and antenna 50. The micro strip, strip line, twin line, and tri-plate preferably comprise layers of parallel conductors separated by a dielectric, and the coaxial implementation includes concentrically arranged inner and outer conductors separated by a dielectric. Accordingly, feed line 55 between fabric antenna 50 and RF tag 200 can be implemented using conducting and insulating fabric layers similar to that used to fabricate antenna 50. In this manner, feed line 55 may be concealed, embedded, or part of the fabric forming, for example, a garment.

As disclosed herein, fabric antenna 50 is located outside of RF tag housing 30. Thus, RF tag 200 can be made smaller than heretofore RF tags having a built-in antenna housed within the RF tag's housing 30. The size of the form factor for RF tag 200 is not constrained by the configuration of fabric antenna 50 or vice versa, in accordance with the present teachings. Moreover, operational advantages, such as improving the detection capabilities of RF tag 200, can be realized by coupling fabric antenna 50 to RF tag 200 in accordance with the present teachings since antenna 50 is not constrained by the size of RF tag housing 30. Thus, the size, shape, and routing of fabric antenna 50 can be implemented for optimal performance of RF tag 200.

Figure 3:
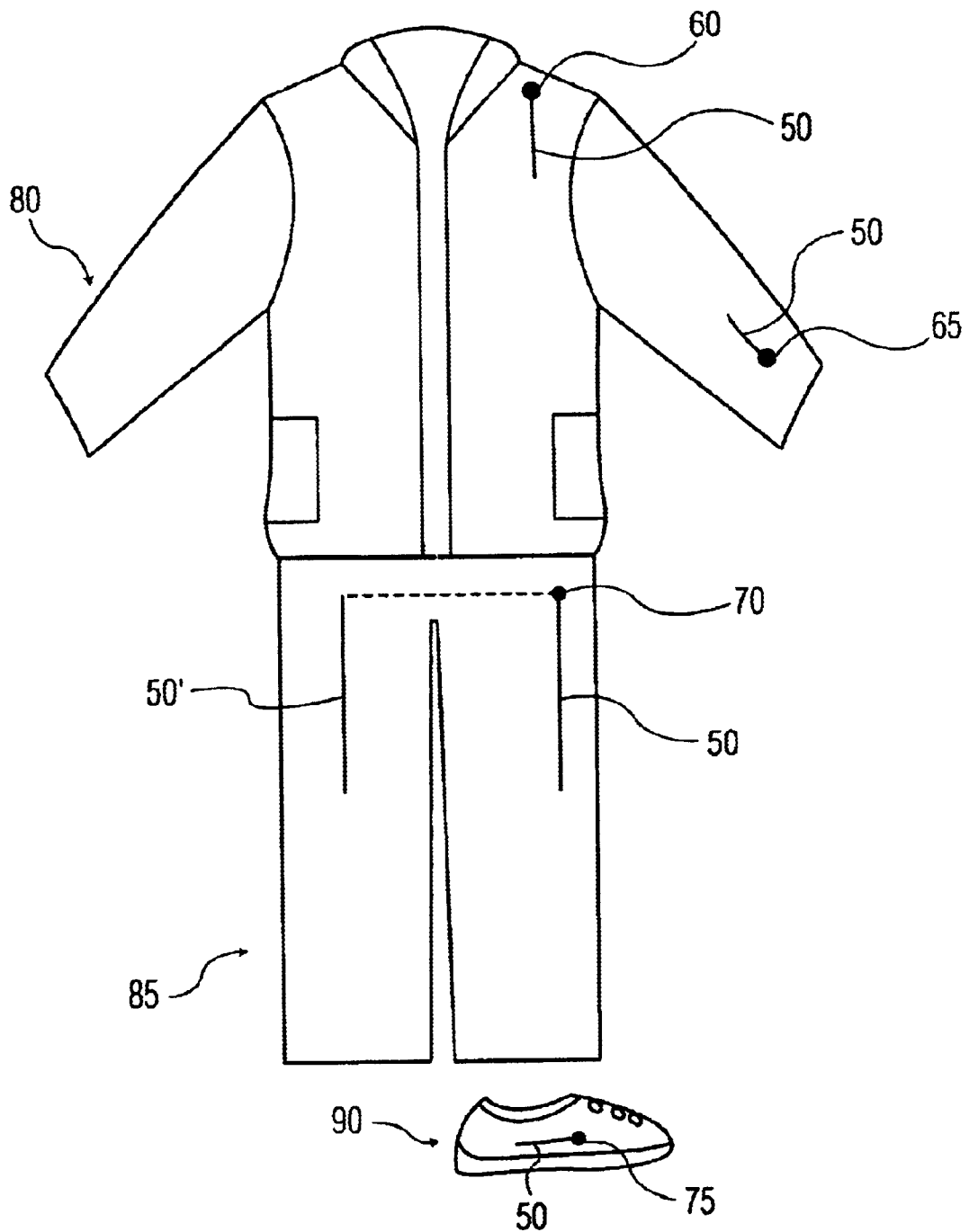
FIG. 3 is an illustrative implementation of an RF tag having a fabric antenna coupled thereto and incorporated into various articles of clothing in accordance with the present teachings.

In an aspect of the present teachings, fabric antenna is flexible and pliant, thereby lending itself to taking on and conforming to the shape of, for example, the garment to which RF tag 200 and fabric antenna 50 are attached. Referring to FIG. 3, a number of examples of an RF tag and associated fabric antenna(s) coupled thereto are shown. For example, RF tag 60 is located in the upper shoulder area of jacket 80. Also illustrated is RF tag 65 embedded in the lower sleeve area of jacket 80. RF tag 75 coupled to a fabric antenna 50 is located in shoe 90. The placement of RF tag 50 in shoe 90 may be particularly advantageous where the RF interrogator is located in a floor. RF tag 70 in pant 85 illustrates an example wherein multiple fabric antennas, namely fabric antenna 50 and 50', are coupled to a common RF tag.

It should be appreciated by those skilled in the art that the system environment, fabric antenna 50, the articles of clothing, and other aspects of the teachings herein are but examples of operational environments suitable for the fabric antenna of the present teachings, and thus do not limit the scope or variety of applications that the present invention may be suitably implemented. Thus, it should be understood that the foregoing description is only illustrative of a present implementation of the teachings herein. Various alternatives and modification may be devised by those skilled in the art without departing from the invention. Accordingly, the present invention is intended to embrace all such alternatives, modifications, and variances which fall within the scope of the appended claims.

What we claim is:

1. A radio frequency (RF) transponder, said transponder comprising:

a transponder housing;

an RF circuit enclosed in said transponder housing; and a fabric antenna located outside of said transponder housing and coupled to said RF circuit, wherein said fabric antenna is comprised of at least one material selected from the group consisting of: conductive thread, conductive glue, and interfaced layers of conductive material.

2. The RF transponder of claim 1, wherein said fabric antenna comprises a conductive material disposed on a fabric surface.

3. The RF transponder of claim 1, wherein said fabric antenna comprises a conductive material concealed in a seam of a fabric surface.

4. The RF transponder of claim 1, wherein said fabric antenna comprises at least one conductive thread interwoven with a fabric surface.

5. The RF transponder of claim 1, wherein said fabric antenna is comprised of at least one material selected from the group consisting of: a conductive material, an insulating material, and a dielectric material.

6. The RF transponder of claim 1, wherein said fabric antenna is flexible.

7. The RF transponder of claim 1, wherein a size, shape, or routing of said fabric antenna is greater than an area enclosed by said transponder housing.

8. A method of fabricating a radio frequency (RF) transponder, said method comprising the steps of:

enclosing an RF circuit in a transponder housing;

locating a fabric antenna outside of said transponder housing; and coupling said fabric antenna to said RF circuit, wherein said fabric antenna comprises at least one material selected from the group consisting of: conductive thread, conductive glue, and interfaced layers of conductive material.

9. The method of claim 8, further comprising a step of forming said fabric antenna.

10. The method of claim 8, wherein said fabric antenna comprises a conductive material disposed on a fabric surface.

11. The method of claim 8, wherein said fabric antenna comprises a conductive material concealed in a seam of a fabric surface.

12. The method of claim 8, wherein said fabric antenna comprises at least one conductive thread interwoven with a fabric surface.

13. The method of claim 8, wherein said fabric antenna comprises at least one material selected from the group consisting of: a conductive material, an insulating material, and a dielectric material.

14. The method of claim 8, wherein said fabric antenna is flexible.

15. The method of claim 8, comprising configuring a size, shape, or routing said fabric antenna greater than an area enclosed by said transponder housing.

\* \* \* \* \*